US012755988B2

(12) United States Patent
Wolfangel et al.

(10) Patent No.: US 12,755,988 B2
(45) Date of Patent: Oct. 6, 2026

(54) BIPOLAR PLATE AND FUEL CELL STACK

(71) Applicant: Robert Bosch GmbH, Stuttgart (DE)

(72) Inventors: Florian Alexander Wolfangel, Stuttgart (DE); Harald Schmeisser, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 690 days.

(21) Appl. No.: 18/030,566

(22) PCT Filed: Sep. 29, 2021

(86) PCT No.: PCT/EP2021/076817
§ 371 (c)(1),
(2) Date: Apr. 6, 2023

(87) PCT Pub. No.: WO2022/073824
PCT Pub. Date: Apr. 14, 2022

(65) Prior Publication Data

US 2023/0378483 A1 Nov. 23, 2023

(30) Foreign Application Priority Data

Oct. 8, 2020 (DE) ..................... 10 2020 212 726.3

(51) Int. Cl.
*H01M 8/0258* (2016.01)
*H01M 8/0267* (2016.01)
*H01M 8/1004* (2016.01)

(52) U.S. Cl.
CPC ....... *H01M 8/0258* (2013.01); *H01M 8/0267* (2013.01); *H01M 8/1004* (2013.01)

(58) Field of Classification Search
None
See application file for complete search history.

(56) References Cited

U.S. PATENT DOCUMENTS 6,426,160 B1 7/2002 Hagino et al.
2006/0257704 A1* 11/2006 Ogino ............... H01M 8/04067 429/495
2019/0319279 A1* 10/2019 Kunz .................. H01M 8/1004

FOREIGN PATENT DOCUMENTS

CN 101111958 A 1/2008
CN 105637689 A 6/2016
(Continued)

OTHER PUBLICATIONS

Translation of International Search Report for Application No. PCT/EP2021/076817 dated Mar. 14, 2022 (2 pages).

*Primary Examiner* — Maria V Ewald
*Assistant Examiner* — Suhani Jitendra Patel
(74) *Attorney, Agent, or Firm* — Michael Best & Friedrich LLP

(57) ABSTRACT

The invention relates to a bipolar plate (10) for a fuel cell stack (100). The bipolar plate (10) has a main extension plane (HE) and a main flow direction (HR) on the main extension plane (HE), a first bipolar plate half (12), a second bipolar plate half (14), an active field (40). a distribution region (50), and a port region (60).
The port region (60) lias at least one port for supplying al least one fluid (F) onto the main extension plane (HE),
said active field (40) having at least one cooling fluid channel structure (42) for a cooling process using a cooling fluid (KF) and al least one fuel channel structure (44) for supplying at least one fluid (F) to at least one adjacent membrane electrode assembly (110) of the fuel cell stack (100). The first bipolar plate lialf (12) and the second bipolar plate half (14) form at least one distribution channel structure (52) in the distribution region (50). wherein the distribution channel structure (52) is designed such that a cooling fluid (KF) flows through the distribution channel structure at an angle to the main flow
(Continued)

direction (HR) on the main extension plane (HE), and the thickness (D1) of the bipolar plate (10) in the distribution region (50) is greater than the greatest thickness (D2) of the bipolar plate (10) in the active field (40).
The invention additionally relates Io a fuel cell stack (100) with at least one bipolar plate (10) and at least one membrane electrode assembly (110).

10 Claims, 3 Drawing Sheets

(56) References Cited

FOREIGN PATENT DOCUMENTS

| | | | | | |
|---|---|---|---|---|---|
| CN | 210296507 | U | | 4/2020 | |
| DE | 69923023 | T2 | | 3/2006 | |
| DE | 102015223930 | A1 | | 6/2017 | |
| EP | 2730680 | A1 | | 5/2014 | |
| GB | 2565373 | A | * | 2/2019 | .......... H01M 8/0254 |
| WO | WO-2013140137 | A1 | * | 9/2013 | ............ H01M 8/026 |

* cited by examiner

BIPOLAR PLATE AND FUEL CELL STACK

BACKGROUND

Hydrogen is an excellent alternative to batteries as an energy storage system for mobile applications, since no environmentally polluting raw materials (e.g., lithium) need be used for the production of the storage, and the hydrogen-filled pressure vessel weighs only a fraction of a comparable battery at the same energy content. To generate power in a fuel cell, the hydrogen is oxidized to $H_2O$ in e.g. a mobile application together with oxygen. The energy released is largely generated as electrical energy and is available to the electrical consumers of the mobile application.

In known fuel cells, most bipolar plates are used for flow directing fuel fluids and/or cooling fluids. The purpose of the bipolar plates is to distribute gases and coolants homogeneously over the active surface of the cell. Each cell is connected to the other cells in a stack via inlet and outlet channels for each medium, which are also called ports. The gas must be directed from the port to the active surface. This can be achieved via distribution channels in a distribution field. Regarding embossed metallic bipolar plates, the channel structure of the coolant results in a negative form of the channel structure for air and hydrogen. In order to reduce the pressure drop of the reactants, a distribution channel is often used to connect multiple channels in the active field. This circumstance results in not all coolant bars in the active surface being connected without adjusting the channel structure. However, only those surfaces having a bar in the distribution field, i.e., for three powered active channels with one distribution channel, two of the bars in this three-part package are not supplied with coolant from this half-plate. Due to different boundary conditions in the inlet and outlet regions, in particular the connection between the at least one port to the active surface, an unequal mass flow distribution is created in the active field, in particular for the cooling fluid.

SUMMARY

The present invention discloses a bipolar plate for a fuel cell stack and a fuel cell stack having at least one bipolar plate and at least one membrane electrode assembly.

According to a first aspect, the present invention features a bipolar plate for a fuel cell stack. The bipolar plate has a main extension plane and a main flow direction on the main extension plane, a first bipolar plate half, a second bipolar plate half, an active field, a distribution region, and a port region. The port region has at least one port for supplying at least one fluid onto the main extension plane. The active field has at least one cooling fluid channel structure for a cooling process using a cooling fluid and at least one fuel channel structure for supplying at least one fluid to at least one adjacent membrane electrode assembly of the fuel cell stack. The first bipolar plate half and the second bipolar plate half form at least one distribution channel structure in the distribution region, wherein the distribution channel structure is designed such that the cooling fluid flows through the distribution channel structure at an angle to the main flow direction on the main extension plane, wherein the thickness of the bipolar plate in the distribution region is greater than the greatest thickness of the bipolar plate in the active field.

In the context of the invention, the thicknesses described are understood as an extension orthogonal to the main extension plane of the bipolar plate. The main extension plane is defined by the dimensions of the bipolar plate and spans along the length and width of the bipolar plate. The main flow direction is defined by the channel structures of the active field of the bipolar plate enabling flow of the at least one fluid, in particular of fuel and/or reactants, parallel or substantially parallel to the bipolar plate and/or the membrane electrode assembly of the fuel cell stack. In a fuel cell stack according to the present invention, bipolar plates in a stacking direction are stacked preferably alternating with membrane electrode assemblies. The main extension planes of the bipolar plates and/or the membrane electrode assemblies are arranged to be parallel to one another or substantially parallel to one another. In the context of the invention, the wording “X or substantially X” is understood to mean as low a deviation as possible, e.g. based on manufacturing tolerances and/or material properties, without altering the underlying intended function of the feature.

The distribution field and the active field are preferably arranged adjacent to the main extension plane, wherein the distribution field in particular encloses the active field and/or borders the active field on two sides, in particular two opposite sides. The distribution field is preferably arranged between the port region and the active field in the main extension plane of the bipolar plate.

The cooling fluid channel structure and the fuel channel structure of the bipolar plate are designed such that cooling fluid or fuel flows along the main flow direction. To supply fuel to the membrane electrode assemblies adjacent to the bipolar plate in a fuel cell stack according to the invention, the fuel channel structure further preferably enables a flow of the fuel in a direction orthogonal to or substantially orthogonal to the main extension plane of the bipolar plate, in particular into the membrane electrode assemblies and/or a gas diffusion layer.

The distribution channel structure is designed such that the cooling fluid flows through it at an angle, in particular perpendicular or substantially perpendicular, to the main flow direction in the main extension plane. In descriptive terms, the distribution channel structure then preferably runs transversely in front of the active field, the cooling fluid channel structure, and/or the fuel channel structure, in the main extension plane of the bipolar plate. Hydrogen and oxygen are preferably understood to mean reactants of the bipolar plate according to the invention for a fuel cell stack according to the invention.

The bipolar plate according to the invention is particularly advantageous because the bipolar plate has a greater thickness in the distribution region than the greatest thickness of the bipolar plate in the active field. The thickness of the bipolar plate in the active field varies in the section through the channel structures of the bipolar plate. The first bipolar plate half and the second bipolar plate half generally comprise embossed and deeply embossed regions, which form the channel structures in the bipolar plate design. For example, the greatest thickness of the bipolar plate in the active field is obtained in a section through the active field at the depth of a cooling fluid channel structure. When stacking bipolar plates according to the present invention into a fuel cell stack, membrane electrode assemblies are arranged between the bipolar plates. As a result, the thickness of the membrane electrode assemblies must be taken into consideration when structurally designing the bipolar plate in the active field. However, in regard to the distribution region in which the membrane electrode assembly has no thickness and/or said thickness is not taken into consideration, this means that a potential installation space within the thickness of the bipolar plate will exist in the distribution region. Said installation space is, among other things, advantageously used by the bipolar plate according to the invention such that the cooling fluid flows through the distribution channel structure at an angle to the main flow direction on the main extension plane. In other words, the design of the bipolar plate according to the invention advantageously uses a thickness difference between the active field and the distribution region by virtue of taking the thickness of a membrane electrode assembly into consideration with respect to the cooling fluid flowing through the distribution channel structure at an angle to the main flow direction in the main expansion plane.

As a result, the bipolar plate according to the invention is particularly advantageous because the distribution channel structure is designed to optimize installation space, thus enabling and/or improving an even mass flow distribution of the cooling fluid over the active field.

Of course, the features of the bipolar plate according to the invention described are also applicable to known end bipolar plates (sometimes referred to as "monopolar plates") of fuel cells and are also covered by the disclosure of the invention.

According to a preferred embodiment of the bipolar plate according to the invention, it is provided that the at least one distribution channel structure is in fluidically communicating connection with each at least one cooling fluid channel structure for distribution of the cooling fluid. A connection between each at least one cooling fluid channel structure of the active field of the bipolar plate and the distribution channel structure enables particularly advantageous distribution of the cooling fluid to the cooling fluid channel structure and thus to the active field. A bipolar plate designed in this way advantageously enables pressure compensation in a direction transverse to the main flow direction and/or via the active field. As a result, any unequal mass flow distribution of the cooling fluid of the bipolar plate is diminished and/or even prevented. In descriptive terms, a distribution channel structure of a bipolar plate designed in this way closes the cooling fluid channel structures, in particular all cooling fluid channel structures, briefly with each other via the active field, thus enabling a particularly advantageous exchange of cooling fluid.

According to a preferred embodiment of the bipolar plate according to the present invention, it is provided that the fuel channel structure of the active field has a plurality of channels, wherein in each case at least two channels are in fluidically communicating connection with a common fuel supply channel for supplying fluid to the at least one port. It is advantageous if the bipolar plate according to the invention has a plurality of fuel channels. Further, it is advantageous if the plurality of fuel channels in each case are bundled to at least two or more fuel feed channels, so that preferably a homogeneous flow of fuel occurs via the bundled fuel channels. A bundling of, for example, two fuel channels of the active field to a fuel supply channel in the distribution region and/or the port region within the framework of the invention is understood to mean a bundling of the fluid flows by way of, e.g., a common channel structure without physical separation between the fluid flows.

According to a preferred embodiment of the bipolar plate according to the invention, it is provided that the at least one common fuel supply channel is arranged and/or runs at least in portions above the distribution channel structure in the distribution region. A bipolar plate designed in this way advantageously uses the previously described available installation space in the distribution region, in particular the available thickness in the distribution region. In the context of the invention, arranging the at least one fuel supply channel above the distribution channel structure is understood to mean that at least portions of the at least one fuel supply channel are arranged above the distribution channel structure. The terms above and below are understood as directions of an orthogonal axis through the main extension plane wherein the bipolar plate can obviously be designed in mirror fashion along the main extension plane, so the at least one fuel supply channel can also or exclusively be arranged below the distribution channel structure. A bipolar plate designed in this way is particularly advantageous because a distribution of the cooling fluid through the distribution channel structure in a direction transverse to the active field is enabled, and an advantageous supply of fuel to the active field is enabled, by arranging the fuel supply channel above the distribution channel structure, wherein the utilization of the bipolar plate installation space is improved.

According to a preferred embodiment of the bipolar plate according to the present invention, it is provided that the distribution channel structure is designed such that the first bipolar plate half and/or the second bipolar plate half in the extension along the main flow direction are designed to be at least double-angled, in particular wherein the first bipolar plate half and/or the second bipolar plate half are designed to be angled at least once with respect to one another in the extension along the main flow direction. For a particularly advantageous use of the installation space of the bipolar plate, the bipolar plate according to the invention has a thickness difference between the active field and the distribution region. In order to take this thickness difference into account in the structural design of the bipolar plate, according the further development of the invention the bipolar plate is preferably designed to be at least double-angled along the main flow direction. The two resulting bends are preferably opposite to one another so that the bipolar plate is preferably designed to be parallel before and after the two bends and/or the bends generate a slope of the bipolar plate between two parallel planes of the bipolar plate. Preferably, the first bipolar plate half and the second bipolar plate half are designed in mirror fashion with respect to one another and/or are designed to be angled at least once with respect to one another along the main flow direction. A bipolar plate designed in this way is particularly advantageous because the distribution channel structure is designed to be inexpensive and use particularly straightforward structural means, wherein the bipolar plate is designed to particularly optimize installation space.

According to a preferred embodiment of the bipolar plate according to the invention, it is provided that the bipolar plate has at least one cooling fluid supply channel structure, wherein the at least one cooling fluid supply channel structure has a fluidically communicating connection between the at least one port region and the distribution channel structure. The cooling fluid supply channel structure enables a fluidically communicating connection between a cooling fluid port and the distribution channel structure and thus a supply of cooling medium for the active field of the bipolar plate. The cooling fluid supply channel structure is preferably arranged on the main extension plane of the bipolar plate. The cooling fluid supply channel structure can be designed in individual or bundled channel structures.

According to a preferred embodiment of the bipolar plate according to the invention, it is provided that the cooling fluid supply channel structure is designed in the shape of a hollow bar, wherein the thickness of the bipolar plate in the distribution region in particular is defined or substantially defined by virtue of the at least one cooling fluid supply channel structure being designed in the shape of a hollow bar. The cooling fluid supply channel structure being designed in the shape of a hollow bar is understood to mean that the cooling fluid supply channel structure is designed within a bar or a bar-shaped structure. A bar and/or a bar-shaped structure, in turn, is a slender elevation to the surrounding structure with longitudinal extent. Design of the cooling fluid supply channel structure in the shape of a hollow bar is particularly advantageous because doing so leads to a minimal installation space requirement and enables advantageous flow supply for both the internal cooling fluid supply channel structure and for external flows. In particular, the hollow bar shape of the cooling fluid supply channel structure protrudes from the remaining constructive design of the bipolar plate so as to define and/or determine the thickness of the bipolar plate in the distribution region by virtue of the cooling fluid supply channel structure being designed to have the shape of a hollow bar. In other words, the cooling fluid supply channel structure designed in the shape of a hollow bar preferably represents the largest thickness of the bipolar plate in the distribution region.

According to one preferred embodiment of the bipolar plate according to the invention, it is provided that the at least one cooling fluid supply channel structure separates at least portions of at least two fuel supply channels from one another in a fluidically communicating manner. Particularly preferably, at least two fuel supply channels are separated from one another in a fluidically communicating manner by virtue of the cooling fluid supply channel structure being designed in the shape of a hollow bar. In particular, at least two fuel supply channels are separated from one another in a fluidically communicating manner by virtue of each cooling fluid supply channel structure being designed in the shape of a hollow bar. A bipolar plate designed in this way is particularly advantageous because designing the cooling fluid supply channel structure in the shape of a hollow bar consequently performs a flow-bearing function through both the inner structure and the outer structure. On the one hand, the cooling medium is guided through the interior of the cooling fluid supply channel structure, which is designed in the shape of a hollow bar and, on the other hand, at least two fuel supply channels are separated from one another in a fluidically communicating manner along the exterior structure of the cooling fluid supply channel structure, which is designed in the shape of a hollow bar.

According to a preferred embodiment of the bipolar plate according to the invention, it is provided that the at least one cooling fluid supply channel structure is arranged at least partially above the distribution channel structure, wherein the cooling fluid supply channel structure in particular is in fluidically downward communication with the distribution channel structure. A bipolar plate designed in this way is particularly advantageous because the at least one cooling fluid supply channel structure is advantageously arranged at least partially above the distribution channel structure in order to maximize installation space. Further, with a bipolar plate designed in this way, a fluidically communicating connection between the cooling fluid supply channel structure and the distribution channel structure can occur downwardly, i.e., at least in portions and in a direction orthogonal to the main extension plane. A bipolar plate designed in this way is particularly advantageous because no separate channel structure is required for a fluidically communicating connection between the cooling fluid supply channel structure and the distribution channel structure, thus advantageously optimizing and saving installation space.

According to a second aspect, the present invention features a fuel cell stack. The fuel cell stack has at least one bipolar plate and at least one membrane electrode assembly, in which case the at least one bipolar plate is designed according to the first aspect, in particular wherein the at least one membrane electrode assembly has a thickness, and said thickness of the membrane electrode assembly corresponds or substantially corresponds to the difference in the thickness of the bipolar plate in the distribution region and the greatest thickness of the bipolar plate in the active field. In particular, at least one subgasket and/or other sealing material can be arranged between adjacent bipolar plates. Said at least one subgasket and/or the other seal material is preferably not taken into consideration when examining the thickness difference between the bipolar plate according to the invention between the active field and the distribution range, since the sub-gasket and/or the other seal material is preferably both in the active field and in the distribution range and/or arranged parallel or substantially parallel to these. The gas diffusion layer of the at least one membrane electrode assembly therefore preferably has a thickness, and said thickness of the gas diffusion layer corresponds or substantially corresponds to the difference between the thickness of the bipolar plate in the distribution region and the greatest thickness of the bipolar plate in the active field.

Regarding the fuel cell stack according to the invention, it can further be provided that the first bipolar plate half, the second bipolar plate half, and the membrane electrode assembly are designed in a plate-like manner, wherein the membrane electrode assembly has a lower base surface than a base surface of the first bipolar plate half and/or the second bipolar plate half. Regarding the fuel cell stack according to the invention, it can further be provided that the fuel cell stack, in particular the at least one bipolar plate, has an active field for cooling and/or supplying the at least one membrane electrode assembly using at least one fluid and a distribution field for distributing at least one fluid. Regarding the fuel cell stack according to the invention, it can further be provided that the at least one membrane electrode assembly is arranged in the region, in particular exclusively in the region, of the active field. The fuel cell stack also includes the aforementioned advantages, as already described above, with respect to the bipolar plate according to the invention. As a result, the fuel cell stack according to the invention is particularly advantageous because the distribution channel structure is designed to optimize installation space, thus enabling and/or improving an even mass flow distribution of the cooling fluid over the active field.

BRIEF DESCRIPTION OF THE DRAWINGS

The device according to the invention and the fuel cell system according to the invention are explained in greater detail hereinafter with reference to the drawings. Shown are.

DETAILED DESCRIPTION

Figure 1:
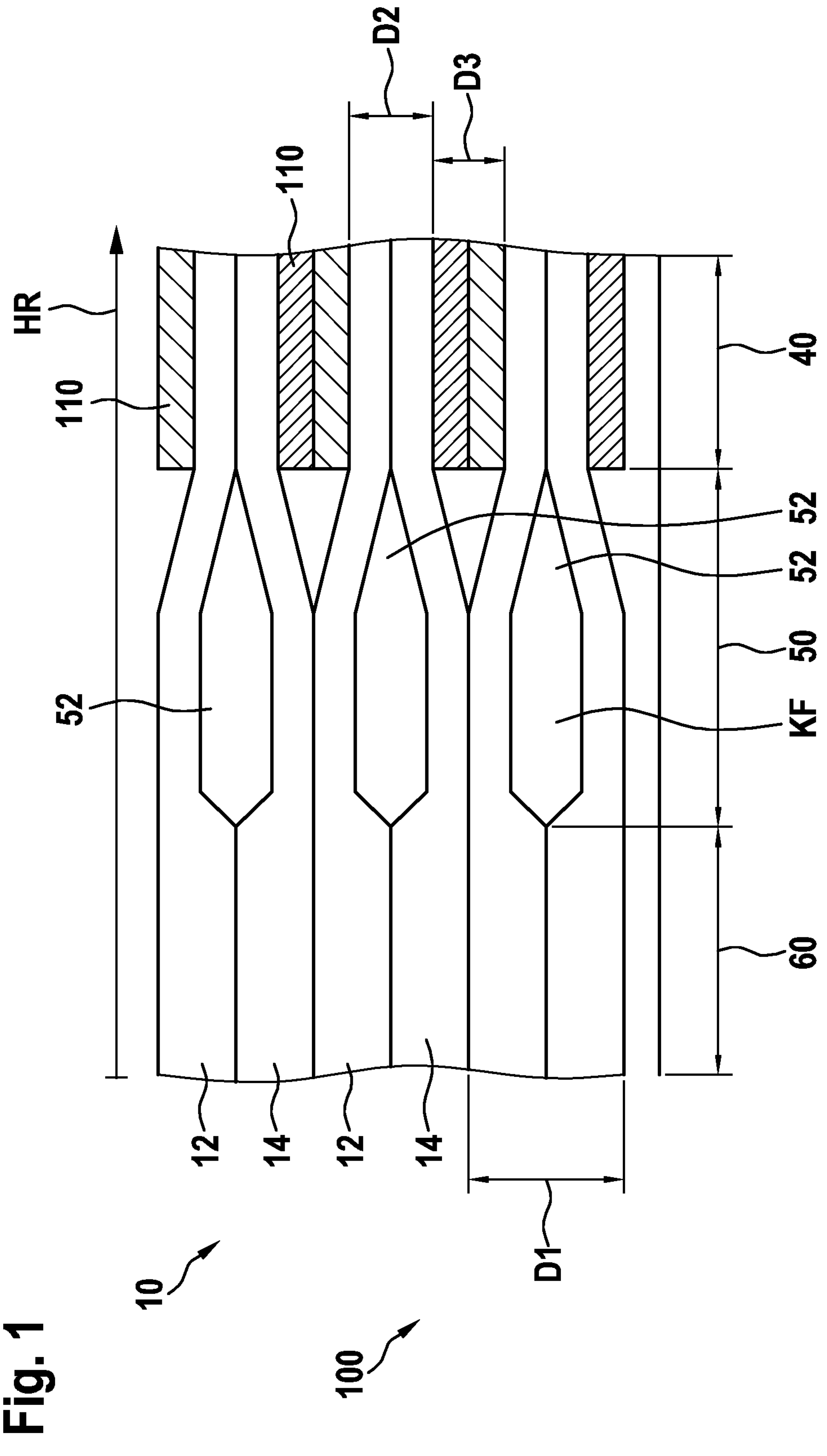
FIG. 1 a side view of a fuel cell stack with three bipolar plates.
Figure 2:
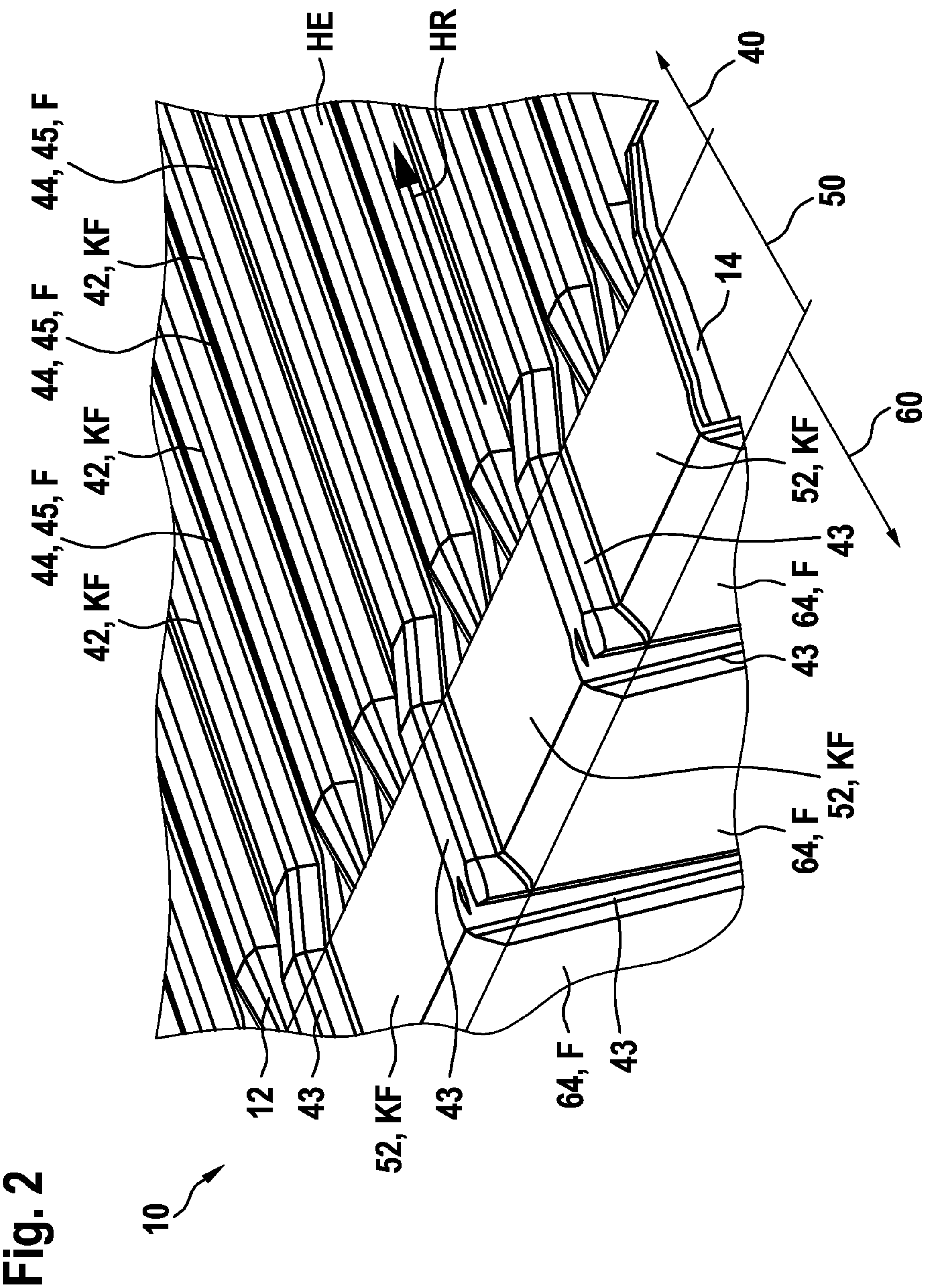
FIG. 2 a perspective view of a bipolar plate.
Figure 3:
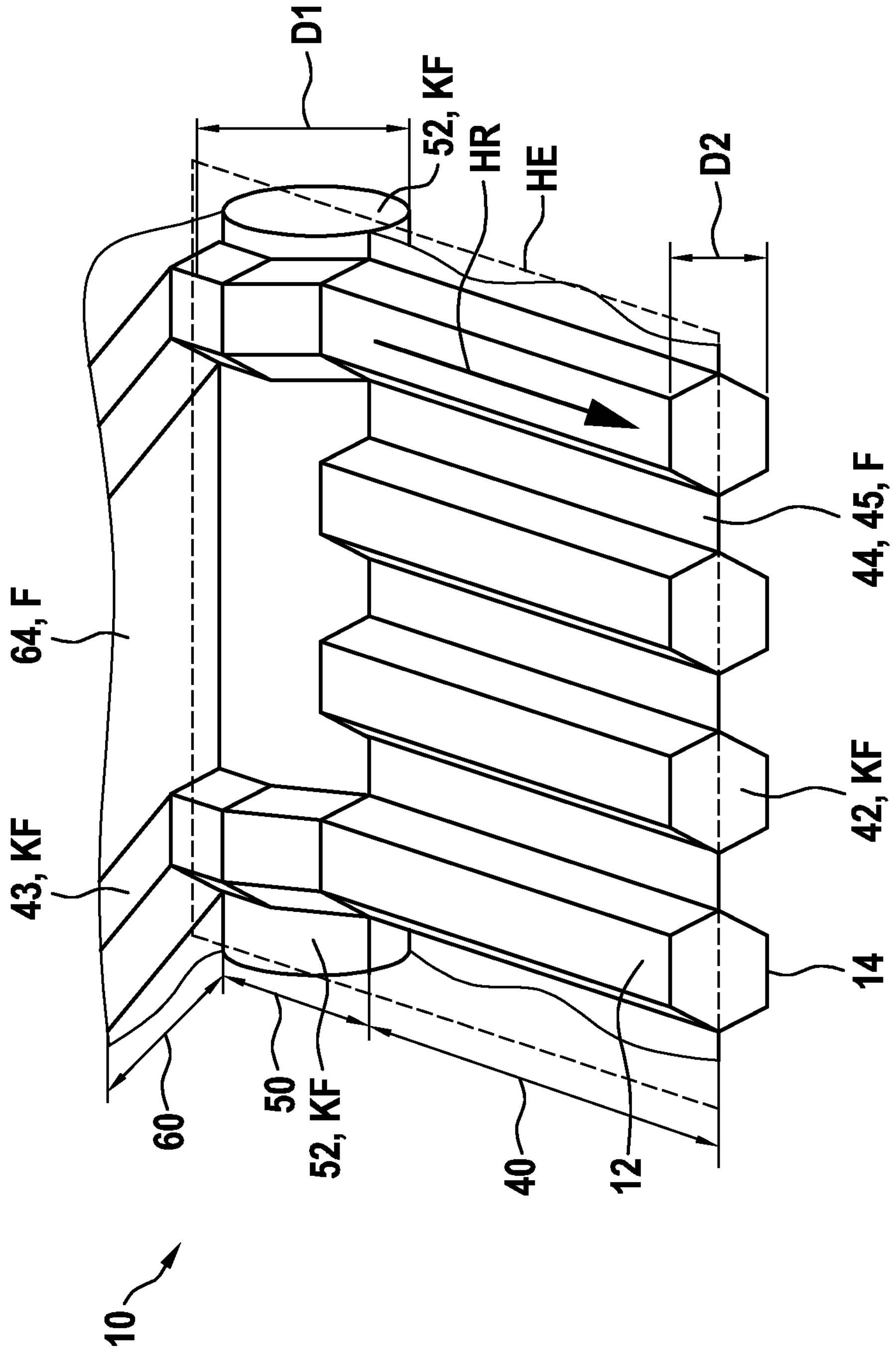
FIG. 3 a further perspective view of a further bipolar plate.

Elements having the same function and mode of action are in each case provided with the same reference signs in FIGS. 1 to 3.

FIG. 1 is a side view of a fuel cell stack 100 having three bipolar plates 10. The bipolar plates 10 have a main flow direction HR, a first bipolar plate half 12 and a second bipolar plate half 14, an active field 40, a distribution region 50, and a port region 60. The active panel 40 has at least one cooling fluid channel structure 42 (not shown) for cooling with a cooling fluid KF and at least one fuel channel structure 44 (not shown) for supplying at least one adjacent membrane electrode assembly 110 of the fuel cell stack 100 with at least one fluid F (not shown). The first bipolar plate half 12 and the second bipolar plate half 14 each form a distribution channel structure 52 in the distribution region 50, wherein the distribution channel structure 52 is designed such that the cooling fluid KF flows through it at an angle to the main flow direction HR (in this case, e.g., on the drawing plane), wherein the thickness D1 of the bipolar plates 10 in the distribution region 50 is greater than the greatest thickness D2 of the bipolar plate 10 in the active field 40. The membrane electrode assemblies 110 have a thickness D3, wherein the thickness D3 of the membrane electrode assemblies 110 corresponds to the difference between the thickness D1 of the bipolar plate in the distribution region 50 and the greatest thickness D2 of the bipolar plate 10 in the active field 40. The first bipolar plate half 12 and the second bipolar plate half 14 are designed to have a double-angled design of the distribution channel structure 52 in the extension along the main flow direction HR, wherein the first bipolar plate half 12 and the second bipolar plate half 14 are designed to have at least one angle with respect to one another in the extension along the main flow direction HR.

FIG. 2 is a perspective view of a bipolar plate 10. The perspective view shows how the active panel 40 comprises a cooling fluid channel structure 42 for cooling with a cooling fluid KF and a fuel channel structure 44 for supplying at least one adjacent membrane electrode assembly 110 (not shown) of the fuel cell stack 100 having at least one fluid F. Further, FIG. 2 shows that the fuel channel structure 44 of the active panel 40 has a plurality of channels 45, wherein in each case three channels 45 are connected in fluidic communication with a common fuel supply channel 64 for supplying fluid F to the at least one port, wherein the common fuel supply channels 64 are arranged in the distribution region 50 above the distribution channel structure 52. Further, FIG. 2 shows that the bipolar plate 10 has a plurality of cooling fluid supply channel structures 43, wherein the cooling fluid supply channel structures 43 have a fluidically communicating connection between the at least one port region 60 and the distribution channel structure 52. The cooling fluid supply channel structures 43 are designed in the shape of a hollow bar, wherein the hollow bar-shaped design of the cooling fluid supply channel structures 43 defines the thickness D1 (not shown) of the bipolar plate 10 in the distribution region 50. Further, the cooling fluid supply channel structures 43 fluidically separate the fuel supply channels 64 from each other. The cooling fluid supply channel structures 43 are arranged at least partially above the distribution channel structure 52, wherein the cooling fluid supply channel structures 43 are in fluidically downward communicating connection with the distribution channel structure 52.

FIG. 3 is a further perspective view of a further bipolar plate 10. The main extension plane HE of the bipolar plate 10 is indicated with dashes. In contrast to the main flow direction HE, FIG. 3 is a perspective view from the active field 40 onto the distribution region 50, with the distribution channel structure 52 being arranged transversely and the port region 60 located behind it. The cooling fluid channel structure 42 opens directly into the distribution channel structure 52 and is guided in parts (every third channel in this case) via the distribution channel structure 52. The overhead structural design of the distribution channel structure 52 advantageously separates the fuel supply channels 64 from one another in fluidic communication and, on the other hand, enables a defined thickness D1 in the distribution region 50 for an advantageous stacking of the bipolar plates 10 in a fuel cell stack 100 (not shown). The cooling fluid KF is guided through the cooling fluid supply channel structures 43 to the distribution channel structure 52, then preferably from there to all of the cooling fluid channel structures 42.

The invention claimed is:

1. A bipolar plate (10) for a fuel cell stack (100), the bipolar plate (10) having a main extension plane (HE) and a main flow direction (HR) on the main extension plane (HE), a first bipolar plate half (12), a second bipolar plate half (14), an active field (40), a distribution region (50), and a port region (60), wherein the port region (60) has at least one port for supplying at least one fluid (F) onto the main extension plane (HE), wherein the active field (40) has at least one cooling fluid channel structure (42) for a cooling process using a cooling fluid (KF) and at least one fuel channel structure (44) for supplying at least one fluid (F) to at least one adjacent membrane electrode assembly (110) of the fuel cell stack (100), wherein the cooling fluid (KF) flows through the at least one cooling fluid channel structure (42) in the main flow direction (HR), wherein the at least one fluid (F) flows through the at least one fluid channel (44) in the main flow direction (HR), and wherein the first bipolar plate half (12) and the second bipolar plate half (14) form at least one distribution channel structure (52) in the distribution region (50), wherein the distribution channel structure (52) is configured such that the cooling fluid (KF) flows through the distribution channel structure (52) in a direction orthogonal to the main flow direction (HR) on the main extension plane (HE), wherein a thickness (D1) of the bipolar plate (10) in the distribution region (50) is greater than a greatest thickness (D2) of the bipolar plate (10) in the active field (40).

2. The bipolar plate (10) according to claim 1, wherein the at least one distribution channel structure (52) is in fluidically communicating connection with each of said at least one cooling fluid channel structure (42) for distribution of the cooling fluid (KF).

3. The bipolar plate (10) according to claim 1, wherein the fuel channel structure (44) of the active field (40) has a plurality of channels (45), wherein in each case at least two channels (45) are in fluidically communicating connection with a common fuel supply channel (64) for supplying fluid (F) using the at least one port.

4. The bipolar plate (10) according to claim 3, wherein at least portions of the common fuel supply channel (64) are arranged in the distribution region (50) above the distribution channel structure (52).

5. The bipolar plate (10) according to claim 1, wherein the distribution channel structure (52) is configured such that the first bipolar plate half (12) and/or the second bipolar plate half (14) in extension along the main flow direction (HR) are configured to be at least double-angled, wherein the first bipolar plate half (12) and/or the second bipolar plate half (14) are configured to be angled at least once with respect to one another in the extension along the main flow direction (HR).

6. The bipolar plate (10) according to claim 1, wherein the bipolar plate (10) has at least one cooling fluid supply channel structure (43), wherein the at least one cooling fluid supply channel structure (43) is in fluidically communicating connection between the at least one port region (60) and the distribution channel structure (52).

7. The bipolar plate (10) according to claim 6, wherein the at least one cooling fluid supply channel structure (43) is configured in a shape of a hollow bar, wherein the thickness (D1) of the bipolar plate (10) in the distribution region (50) is defined or substantially defined by virtue of the at least one cooling fluid supply channel structure (43) being configured in the shape of a hollow bar.

8. The bipolar plate (10) according to claim 6, wherein at least portions of the at least one cooling fluid supply channel structure (43) separate at least two fuel supply channels (64) in a fluidically communicating manner.

9. The bipolar plate (10) according to claim 6, wherein the at least one cooling fluid supply channel structure (43) is arranged at least partially above the distribution channel structure (52), wherein the cooling fluid supply channel structure (43) is in fluidically downward communicating connection with the distribution channel structure (52).

10. A fuel cell stack (100) with at least one bipolar plate (10) and at least one membrane electrode assembly (110), wherein the at least one bipolar plate (10) is configured according to claim 1, wherein the at least one membrane electrode assembly (110) has a thickness (D3), and said thickness (D3) of the membrane electrode assembly (110) corresponding to the difference between the thickness (D1) of the bipolar plate in the distribution region (50) and the greatest thickness (D2) of the bipolar plate (10) in the active field (40).

* * * * *